(12) United States Patent
Aberle

(10) Patent No.: US 11,748,577 B1
(45) Date of Patent: Sep. 5, 2023

(54) COMPUTER-GENERATED CONTENT BASED ON TEXT CLASSIFICATION, SEMANTIC RELEVANCE, AND ACTIVATION OF DEEP LEARNING LARGE LANGUAGE MODELS

(71) Applicant: ROHIRRIM, INC., St Paul, MN (US)

(72) Inventor: Steven Thomas Aberle, St Paul, MN (US)

(73) Assignee: ROHIRRIM, INC., St Paul, MN (US)

( * ) Notice: Subject to any disclaimer, the term of this patent is extended or adjusted under 35 U.S.C. 154(b) by 0 days.

(21) Appl. No.: 18/190,791

(22) Filed: Mar. 27, 2023

Related U.S. Application Data

(60) Provisional application No. 63/399,932, filed on Aug. 22, 2022.

(51) Int. Cl.
| | | |
|---|---|---|
| *G06F 17/00* | (2019.01) | |
| *G06F 40/40* | (2020.01) | |
| *G06F 40/30* | (2020.01) | |
| *G06F 40/169* | (2020.01) | |
| *G06N 20/00* | (2019.01) | |

(52) U.S. Cl.
CPC ............ *G06F 40/40* (2020.01); *G06F 40/169* (2020.01); *G06F 40/30* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,951,658 | B2 * | 3/2021 | Putz | G06Q 10/0637 |
| 10,970,321 | B1 * | 4/2021 | Mapranath | G06F 40/268 |
| 11,263,277 | B1 * | 3/2022 | Podgorny | G06F 16/3329 |
| 2017/0242886 | A1 * | 8/2017 | Jolley | G06F 40/232 |
| 2019/0349320 | A1 * | 11/2019 | Karuppusamy | H04L 51/02 |
| 2022/0237368 | A1 * | 7/2022 | Tran | G06N 3/045 |
| 2023/0140918 | A1 * | 5/2023 | Saxena | G06N 20/00 |
| | | | | 705/7.27 |

* cited by examiner

*Primary Examiner* — Satwant K Singh
(74) *Attorney, Agent, or Firm* — Pillsbury Winthrop Shaw Pittman LLP

(57) ABSTRACT

The disclosure relates to systems and methods of automatically generating unique content including natural language text based on a corpus of previously generated response documents and discrete requirements defined in a requirements specification. The system may use generative stitching that includes multi-layer processes that execute to influence the generation of unique content including natural language text through an artificial intelligence (AI) language transformer model trained to output the content based on previously written material that is semantically relevant to the discrete requirements and is weighted against labeled attributes. The labeled attributes may determine the influence asserted against the language transformer, thereby generating unique on-target content that may be combined to create a computer-generated response document.

20 Claims, 11 Drawing Sheets

| # | Requirement Type | Requirement ID | Requirement Name | Requirement Description | Comments | Assigned Writer | Progress | |
|---|---|---|---|---|---|---|---|---|
| | | | | | | | | Open Document Window |
| Row 1 | Pre-Populated Generalized Response Section (1) | Numeric | String | String | String | LOV | Numeric | ✎ |
| Row 2 | Pre-Populated Generalized Response Section (N) | Numeric | String | String | String | LOV | Numeric | ✎ |
| Row 3 | ML Extracted Requirements Section | Numeric | String | String | String | LOV | Numeric | ✎ |
| Row N | ML Extracted Requirements Section (N) | Numeric | String | String | String | LOV | Numeric | ✎ |
| Row N | Pre-Populated Generalized Response Summary Section | Numeric | String | String | String | LOV | Numeric | ✎ |
| | | | | | | | | Save RDO |

| # | Requirement Type | Requirement ID | Requirement Name |
|---|---|---|---|
| Row 1 | Pre-Populated Generalized Response Section (1) | Numeric | String |
| Row 2 | Pre-Populated Generalized Response Section (N) | Numeric | String |
| Row 3 | ML Extracted Requirements Section (N) | Numeric | String |
| Row 4 | User Annotated Requirements Section (N) | Numeric | String |
| Row N | Pre-Populated Generalized Response Summary Section | Numeric | String |

Annotation Settings

Select what type of RDO section you would like to annotate, then drag your mouse over the text. We will automatically add it to the list.

- Intro Section(s)
- Requirement Name (Management Section)
- Requirement Description (Management Section)
- Requirement Name (Technical Section)
- Requirement Description (Technical Section)
- Summary Section(s)

Close Document Window

Requirement Document ID & Name

Save RDO

COMPUTER-GENERATED CONTENT BASED ON TEXT CLASSIFICATION, SEMANTIC RELEVANCE, AND ACTIVATION OF DEEP LEARNING LARGE LANGUAGE MODELS

CROSS-REFERENCE TO RELATED APPLICATIONS

This application claims the benefit of priority of U.S. Provisional Application No. 63/399,932, filed on Aug. 22, 2022 of which is incorporated by reference in its entirety herein for all purposes.

BACKGROUND

Content generation may be driven by requirements that are to be satisfied. For example, a proposal having natural language text may be written to satisfy request for proposal requirements that indicate information that should be addressed or otherwise included in the proposal.

Various artificial intelligence transformer-based language models may be pretrained to generate text. However, to automatically generate text to address requirements, the language models may require an understanding of content sections in seed material, which may be difficult to computationally achieve for multi-variate unstructured text that may be used for the seed material. In other words, transformer-based language models may require seed material that is relevant to satisfying various requirements and also likely to satisfy those requirements. Likewise, because requirement specifications also include multi-variate unstructured text and other unstructured content, an understanding of content sections that define requirements may also be difficult.

SUMMARY

Various systems and methods may address the foregoing and other problems with computer-generated content. A system may ingest multi-variate data having unstructured content from various sources into a document object store. The ingested multi-variate data may include previously generated response documents and requirement specifications.

The system may train and execute a machine-learning model to transform unstructured content into structured content. The machine-learning model may be trained via deep learning and natural language understanding (NLU) techniques to identify sections of unstructured content and classify each of the identified sections according to a respective label. To train the machine-learning model, the system may apportion a subset of documents to be annotated by human annotators. During this annotation process, human annotators may identify sections within each document and assign a label to each of the sections.

Once the machine-learning model is trained on the subset, the system may apply the machine-learning model to structure and label sections in other documents in the document object store. For example, the machine-learning model may be trained to identify sections of a response document, label each section, and output natural language text or other content contained in each section. In some implementations, the system may assign weighted attributes to each of the sections. The system may use the weighted attributes to re-rank semantically relevant content. The system may store the response document (or identifier that identifies the response document), labeled sections, natural language text or other content, and any weighted attributes in association with one another in a database, such as a relational database. The sections labeled from the response document may each include content that was written as part of an effort to satisfy a corresponding discrete requirement of a requirement specification.

The machine-learning model may also be trained to identify sections of a requirement specification, label each section, and output natural language text or other content contained in each section. The system may store the requirement specification (or identifier that identifies the requirement specification), labeled sections, and natural language text or other content in association with one another in a database, such as a relational database. The sections labeled from the requirement specification may each include content that defines a corresponding discrete requirement.

In operation, the system may receive a requirement specification or a specification identifier that identifies a requirement specification. If the system receives a requirement specification, the system may ingest and label the requirement specification to obtain the discrete requirements defined therein. If the system receives a specification identifier, the system may retrieve the discrete requirements that were previously labeled and stored. For each of the discrete requirements, the system may identify response sections that may be relevant to a discrete requirement. For each discrete requirement, the system may obtain the text of the discrete requirement.

The system may generate a Requirements Driven Outline ("RDO") based on the discrete requirements. The RDO may include a requirement identifier, requirement name, and requirement text, which may be stored in a structured way. Thus, the RDO may define in a structured way one or more discrete requirements that a requirement specification defines in an unstructured way. The user may be provided with the RDO for revision. For example, the user may be able to change an order of discrete requirements, the text (or other content) of a discrete requirement, and/or other aspect of the RDO. For each discrete requirement in the RDO, the system may generate a semantic query to be evaluated against the labeled response sections. The query results from the semantic query may include one or more response sections that are semantically similar to the discrete requirement.

Semantic similarity may refer to a measure of similarity based on semantic content (meaning, context, or structure of words) rather than keyword matching. For example, "transportation" may be semantically similar to "automobile." In this context, semantic similarity may refer to the similarity in meaning of words, context or structure in a discrete requirement and a response section. Thus, a discrete requirement having the word "transportation" may be deemed to be semantically similar to a response section having the word "automobile." On the other hand, in a keyword search, the response section having the word "automobile" would not be returned as a result of a keyword query for "transportation." Alternatively, or additionally, semantic similarity may refer to the relatedness of words rather than keyword matching. For example, "transportation" may be related to "highway." In this context, semantic similarity may refer to the similarity in relatedness of words in a discrete requirement and a response section. Thus, a discrete requirement having the word "transportation" may be deemed to be semantically similar to a response section having the word "highway." Semantic similarity may be measured using a metric based on various techniques, such as topological similarity, statistical similarity, semantics-based similarity, and/or other techniques. To further refine the results, the system may re-rank the query results based on semantic similarity to the discrete requirement.

To yet further refine the semantically re-ranked query results, the system may perform another re-ranking based on the weighted attributes. By doing so, the system may improve identification of the most relevant sections that may serve as the basis for automatic unique text and/or other types of content generation. The identified response sections and the discrete requirement may be provided as input to an AI language model, which generates unique natural language text from the identified sections based on a discrete requirement of the requirement specification. The AI language model may use deep learning on a pretrained corpus of documents that include natural language text from a wide range of domains.

The system may activate the language model via a language model API endpoint, which provides an interface to the language model. To activate the language model, the system may generate a language model influence matrix based on the discrete requirement and re-ranked response sections. The system may provide the language model influence matrix as input via the language model API endpoint to interface with the language model. The language model may return automatically generated text based on the language model influence matrix.

In some implementations, the system may activate the language model using the language model influence matrix a number of instances using different temperature parameter values to obtain different candidate response portions. A temperature parameter of the language model may adjust the level of randomness for the automatically generated text.

For example, the system may activate the language model using the language model influence matrix a first time using a first temperature parameter value and a second time using a second temperature parameter value. The system may, in this example, obtain two candidate response portions as an output of the language model. The two candidate response portions may represent different outputs that are predicted to satisfy the discrete requirement.

The system may generate a generative stitching interface for displaying, to a user, the different selectable candidate response portions. In some implementations, the generative stitching interface may receive user revisions to any one of the candidate response portions. In this manner, the system may receive a selection of a candidate response portion (and any user revisions) the user prefers. The selection (and any user revisions) may be stored as a user preference for feedback training and fine-tuning. The selection may also be added to a response document that is automatically generated to satisfy a requirement specification. The system may generate and output the response document, which may be responsive to a requirement specification.

BRIEF DESCRIPTION OF THE DRAWINGS

Features of the present disclosure may be illustrated by way of example and not limited in the following figure(s), in which like numerals indicate like elements, in which:

FIG. 6B shows an example of an requirements interface that shows requirements obtained from a requirement specification, according to an implementation.

FIG. 6C shows an example of an annotation interface that receives one or more user annotations to adjust a requirements driven outline based on a requirement specification, according to an implementation.

DETAILED DESCRIPTION

Figure 1:
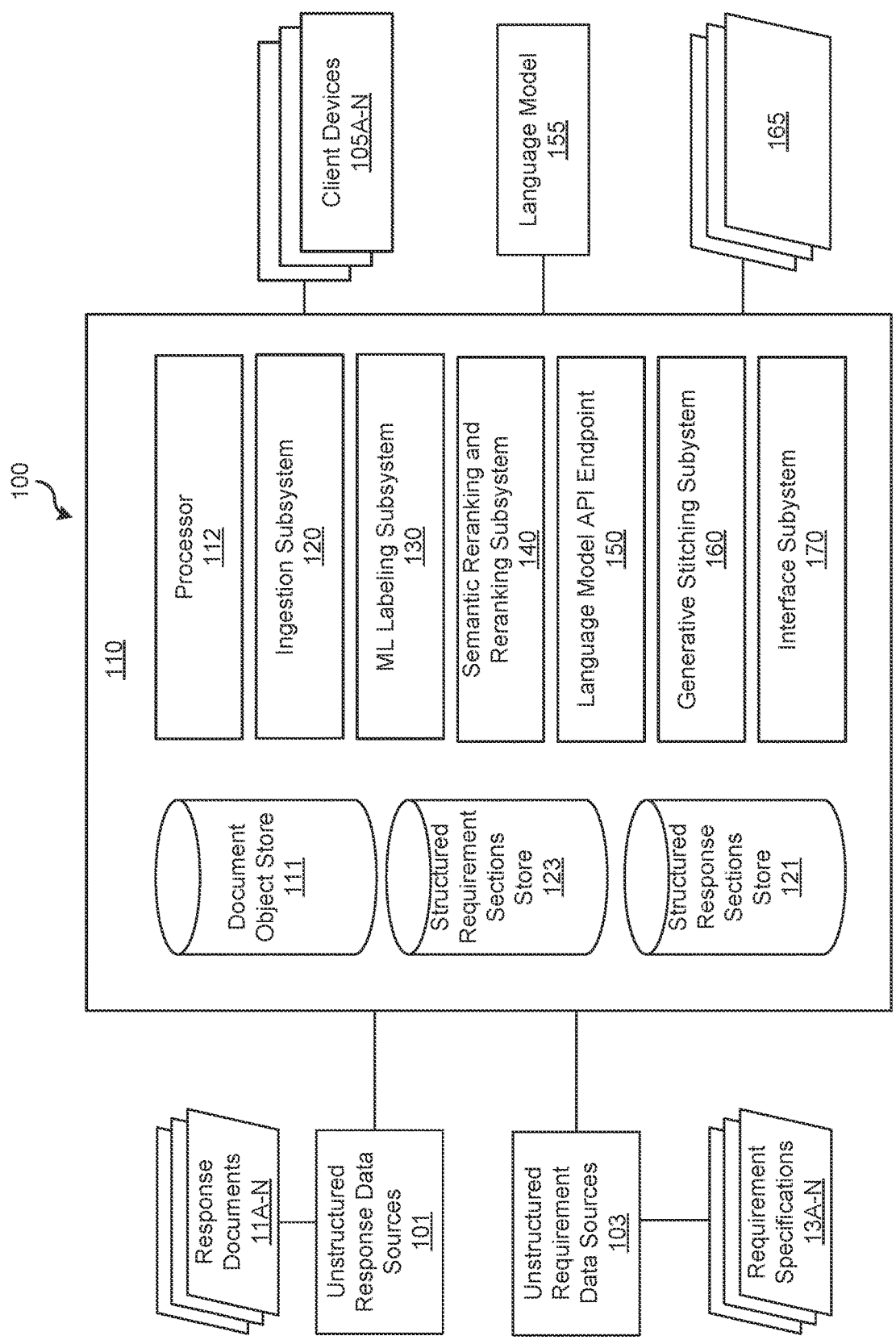
FIG. 1 shows an illustrative system for automatically generating unique content having natural language text that satisfies a requirement specification based on a deep learning AI language model, according to an implementation.

FIG. 1 shows an illustrative system 100 for automatically generating unique content having natural language text that satisfies a requirement specification based on a deep learning AI language model, according to an implementation. Computer-generated content may refer to unique content generated by a computer based on previously generated documents and one or more discrete requirements. A goal of the computer-generated content may be to satisfy the one or more discrete requirements. The content may be unique with respect to the one or more discrete requirements and the unstructured content, as well as alternative instances of automatically computer-generated content that aims to satisfy the same discrete requirements.

A requirement specification may refer to a definition of one or more discrete requirements that seeks to elicit a response that satisfies the discrete requirements. An example of a requirement specification may include a Request for Proposal ("RFP") and similar documents, although other types of requirement specifications, including other examples described herein, may be used. An example of a previously generated document may include a response document that represents a proposal that seeks to satisfy the requirements in the RFP.

In the context of RFPs, a government or other entity may publish an RFP that specifies certain requirements to win a contract with the government. Publishing the RFP may elicit proposals from government contractors or others. Responsive to an RFP, a government contractor may draft a proposal designed to specify why the government contractor should be awarded the contract. Proposal drafting is labor intensive and prone to errors such as not addressing all the requirements of a given RFP. Historically, a given government contractor may write many proposals responsive to respective RFPs. Some of these proposals will win their corresponding contract, while others will not. The computer system 110 may identify and label sections of proposals that win their corresponding contracts in order to serve as the basis for automatically generating natural language text and other types of content in response to a given RFP.

The system 100 may include a plurality of response document sources 101, a plurality of unstructured requirement data sources 103, one or more client devices 105, a computer system 110, a language model 155, and/or other components. A response document source 101 may store a plurality of response documents 11 (illustrated in FIG. 1 as response documents 11A-N). A response document 11 may refer to content that was generated to satisfy one or more discrete requirements of a requirement specification 13 (illustrated in FIG. 1 as requirement specifications 13A-N). The content may include natural language text, graphics, and/or other content. The content may be unstructured in that the content includes sections or portions of content that are not explicitly labeled or ordered. Thus, classifying portions of content may be difficult. A response document 11, or sections thereof, may be modeled to serve as the basis for automatic computer-generated content that addresses the discrete requirements of a requirement specification 13. An example of a response document 11 that is computer-generated includes a proposal that is responsive to a Request for Proposal (RFP), which is an example of a requirement specification 13. Other examples of response documents 11 that are computer-generated by the system 100 to satisfy discrete rules of a requirement specification 13 are contemplated.

An unstructured requirement data source 103 may store a plurality of requirement specifications 13A-N. A requirement specification 13 may refer to a document that defines one or more discrete requirements that should be satisfied in any responsive document, such as a response document 11. A discrete requirement may refer to an indication of content that should be included in a responsive document. Examples of a requirement specification 13 may include an RFP, an article assignment, and/or other data that defines one or more discrete requirements that should be satisfied.

One or more client devices 105 may include various types of devices that may be used by an end user to interact with the computer system 110. For example, client devices 105 may include a desktop computer, laptop computer, tablet computer, smartphone, and/or other types of devices that may communicate with the computer system 110.

To address the foregoing and other issues, the computer system 110 may include one or more processors 112 and/or other components. The processor 112 may include one or more of a digital processor, an analog processor, a digital circuit designed to process information, an analog circuit designed to process information, a state machine, and/or other mechanisms for electronically processing information. Although processor 112 is shown in FIG. 1 as a single entity, this is for illustrative purposes only. In some implementations, processor 112 may comprise a plurality of processing units. These processing units may be physically located within the same device, or processor 112 may represent processing functionality of a plurality of devices operating in coordination.

As shown in FIG. 1, processor 112 is programmed to execute one or more computer program components. The computer program components may include software programs and/or algorithms coded and/or otherwise embedded in processor 112, for example. The one or more computer program components or features may include various subsystems such as an ingestion subsystem 120, a machine learning (ML) labeling subsystem 130, a semantic re-ranking and weighted re-ranking subsystem 140, a language model Application Programming Interface (API) endpoint 150, a generative stitching subsystem 160, an interface subsystem 170, and/or other components.

Processor 112 may be configured to execute or implement 120, 130, 140, 150, 160, and 170 by software; hardware; firmware; some combination of software, hardware, and/or firmware; and/or other mechanisms for configuring processing capabilities on processor 112. It should be appreciated that although 120, 130, 140, 150, 160, and 170 are illustrated in FIG. 1 as being co-located in the computer system 110, one or more of the components or features 120, 130, 140, 150, 160, and 170 may be located remotely from the other components or features. The description of the functionality provided by the different components or features 120, 130, 140, and 150 described below is for illustrative purposes, and is not intended to be limiting, as any of the components or features 120, 130, 140, 150, 160, and 170 may provide more or less functionality than is described, which is not to imply that other descriptions are limiting. For example, one or more of the components or features 120, 130, 140, 150, 160, and 170 may be eliminated, and some or all of its functionality may be provided by others of the components or features 120, 130, 140, 150, 160, and 170, again which is not to imply that other descriptions are limiting. As another example, processor 112 may include one or more additional components that may perform some or all of the functionality attributed below to one of the components or features 120, 130, 140, 150, 160, and 170.

Document Ingestion

The ingestion subsystem 120 may obtain unstructured content for processing by the computer system 110. For example, the ingestion subsystem 120 may obtain multivariate response documents 11 from one or more response document sources 101 and requirement specifications 13 from one or more unstructured requirement data sources 103. The ingestion subsystem 120 may store the response documents 11 and the requirement specifications 13 in the document object store 111 for further processing by the computer system 110. A more detailed example of the ingestion subsystem 120 will be described with reference to FIG. 2 below.

ML Labeling and Comparison

The ML labeling subsystem 130 may transform unstructured content into structured content by identifying sections of the unstructured content and assigning a label for each section. For example, the ML labeling subsystem 130 may use a machine-learning model that uses deep learning and natural language understanding (NLU) to identify sections of unstructured content and classify (assign a label to) each of the identified sections. The machine-learning model may use text classification techniques using annotated content sections of a subset of the unstructured content for deep learning. The annotated content sections are associated with labels assigned by human annotators. Once the machine-learning model is trained on the subset, the ML labeling subsystem 130 may apply the machine-learning model to structure and label sections in other unstructured content in the document object store 111. The ML labeling subsystem 130 may generate a data structure that structures the identified and labeled sections into structured content.

It should be noted that different machine-learning models may be trained for different types of documents. For example, the ML labeling subsystem 130 may use a first machine-learning model to transform response documents 11 into structured data and a second machine-learning model to transform requirement specifications 13 into structured data.

In some implementations, for response documents 11, the ML labeling subsystem 130 may assign weighted attributes to each of the sections. The weighted attributes may be used to re-rank semantically relevant content. The ML labeling subsystem 130 may store the identified and labeled sections and any corresponding weighted attributes in the structured response sections store 121. The identified and labeled sections may serve as the basis for automatically generating unique natural language text and/or other types of content that the computer system 110 predicts will satisfy one or more discrete requirements in a response specification 13.

In some implementations, the ML labeling subsystem 130 may identify one or more discrete requirements from a requirement specification 13. For example, the ML labeling subsystem 130 may access a requirement specification from the document object store 111 and identify and label sections of the requirement specification. Each identified and labeled sections may correspond to one or more discrete requirements. The ML labeling subsystem 130 may generate a data structure that structures the identified and labeled sections into structured content. The ML labeling subsystem 130 may store the identified and labeled sections in the structured requirement sections store 123. Thus, the structured requirement sections store 123 may store all of the discrete requirements (including text and/or other types of content of the discrete requirements) of a requirement specification 13 so that, given an input identifier for the requirement specification 13, the structured requirement sections store 123 may return all of its discrete requirements. A more detailed example of the ML labeling subsystem 130 will be described with reference to FIG. 3 below.

Semantic and Weighted Re-Ranking to Identify Relevant Response Sections

The semantic re-ranking and weighted re-ranking subsystem 140 may identify response sections, which were transformed from response documents 11, that may be relevant to a discrete requirement defined in a requirement specification 13. For example, the semantic re-ranking and weighted re-ranking subsystem 140 may access all of the discrete requirements of a requirement specification 13 for which content for a response document is to be computer-generated. For each discrete requirement, the semantic re-ranking and weighted re-ranking subsystem 140 may obtain the text of the discrete requirement. Based on the obtained text, the semantic re-ranking and weighted re-ranking subsystem 140 may generate a semantic query to be evaluated against the structured response sections store 121. The query results from the semantic query may include one or more response sections, transformed from one or more response documents 11, that are semantically similar to the discrete requirement.

To further refine the results, the semantic re-ranking and weighted re-ranking subsystem 140 may re-rank the query results based on semantic similarity to the discrete requirement and the auto-classification of the discrete requirements or extraction of concepts and entities present in the both the query and the returned results. Semantic similarity may refer to a measure of similarity based on semantic content (meaning, context, or structure of words) rather than keyword matching. For example, "transportation" may be semantically similar to "automobile." In this context, semantic similarity may refer to the similarity in meaning of words, context or structure in a discrete requirement and a response section. Thus, a discrete requirement having the word "transportation" may be deemed to be semantically similar to a response section having the word "automobile." On the other hand, in a keyword search, the response section having the word "automobile" would not be returned as a result of a keyword query for "transportation." Alternatively, or additionally, semantic similarity may refer to the relatedness of words rather than keyword matching. For example, "transportation" may be related to "highway." In this context, semantic similarity may refer to the similarity in relatedness of words in a discrete requirement and a response section. Thus, a discrete requirement having the word "transportation" may be deemed to be semantically similar to a response section having the word "highway." Semantic similarity may be measured based on various techniques, such as topological similarity, statistical similarity, semantics-based similarity, and/or other techniques.

For example, an initial query may be passed to a query engine that queries the structured response sections store 121 as word embeddings (vectors) in a vector space. In some examples, the initial query may be classified against known concepts or known entities to influence the vectors that are generated. Each query can then be expanded upon using concept expansion completion prompts and classification against known keywords and concepts.

To yet further refine the semantically re-ranked query results, the semantic re-ranking and weighted re-ranking subsystem 140 may perform another re-ranking based on the weighted attributes of document categories contained in the structured response section store, including but not limited to binary file meta-data (and associated attributes), AI-generated meta-data (and associated attributes), human-labeled meta-data sections (and associated attributes), and collected feedback meta-data ((and associated attributes). For example, the semantic query results may be combined with scalar functions results, to further refine and rerank results sets. Examples of weighted attributes for primary reranking and secondary reranking are shown in Table 1. By doing so, the semantic re-ranking and weighted re-ranking subsystem 140 may obtain sections of prior responses that are ranked based on semantic similarity to a requirement specification and weighted attributes that may improve identification of the most relevant sections that may serve as the basis for automatic unique text and/or other types of content generation. The identified response sections and the discrete requirement may be provided as input to the language model 155, which generates unique natural language text from the identified sections based on a discrete requirement of the requirement specification. A more detailed example of the semantic re-ranking and weighted re-ranking subsystem 140 will be described with reference to FIG. 4 below.

Generative Stitching to Create Computer-Generated Content

The generative stitching subsystem 160 may activate the language model 155 via the language model API endpoint 150. The term "activate" in this context may refer initiating execution of the language model 155, such as by providing inputs and/or model parameters to the language model 155. For example, the generative stitching subsystem 160 may generate a language model influence matrix based on the discrete requirement and re-ranked content from the semantic re-ranking and weighted re-ranking subsystem 140. The generative stitching subsystem 160 may provide the language model influence matrix as input via the language model API endpoint 150, which may interface with the language model 155. The language model 155 may include a pretrained deep-learning AI large language model trained to generate text from an input such as the language model influence matrix. An example of the language model 155 may include the OpenAI GPT-3 language model, Google LAMBDA, BigScience BLOOM, Multitask Unified Model (MUM), or other transformer-based language models. The language model 155 may return automatically generated text based on the language model influence matrix. In some examples, the generative stitching subsystem 160 may obtain, as an output of the language model 155, different sets of automatically generated text that are different from one another. For example, the generative stitching subsystem 160 may activate the language model 155 using the language model influence matrix a number of instances using different temperature parameter values. A temperature parameter of the language model 155 may adjust the level of randomness for the automatically generated text. Thus, different values of the temperature parameter will result in different levels of randomness in the generated text.

For example, the generative stitching subsystem 160 may activate the language model 155 using the language model influence matrix a first time using a first temperature parameter value and a second time using a second temperature parameter value. The result would be that the language model 155 may automatically generate a first output having natural language text based on the first temperature parameter value and a second output having different natural language text based on the second temperature parameter value. The different outputs may represent different candidate response portions that are predicted to satisfy the discrete requirement.

The interface subsystem 170 may generate user interfaces for display, to a user, the different candidate response portions for selection. In this manner, the interface subsystem 170 may receive a selection of a candidate response portion the user prefers. The selection may be stored as a user preference for feedback training the computer system 110. The selection may also be added to a response that is automatically generated to satisfy a requirement specification. The computer system 110 may invoke the semantic re-ranking and weighted re-ranking subsystem 140 and the generative stitching subsystem 160 for each discrete requirement in the requirement specification, adding an automatically generated response portion for each discrete requirement. In this way, the computer system 110 may automatically generate content, including natural language text, that is responsive to a requirement specification. A more detailed example of the generative stitching subsystem 160 will be described with reference to FIG. 5 below.

Figure 2:
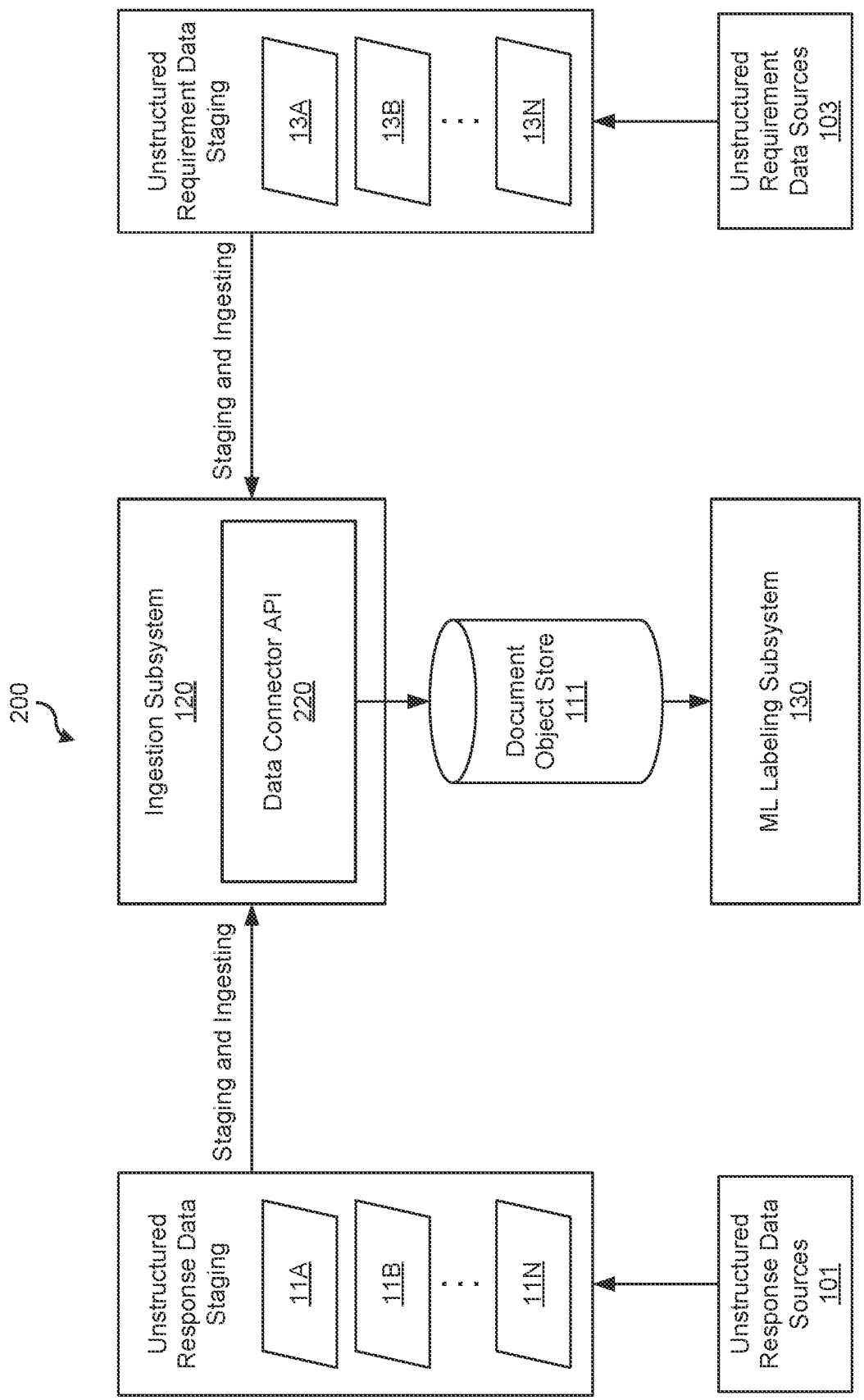
FIG. 2 shows an example of ingesting unstructured data used for language modeling and natural language text generation, according to an implementation.

FIG. 2 shows an example of ingesting unstructured data used for language modeling and natural language text generation, according to an implementation.

For example, an entity may stage their previously prepared response document 11 (illustrated as response document 11A-N) for ingestion by the ingestion subsystem 120. The response document 11 may have been previously prepared by the entity in connection to responding to a requirement specification, such as an RFP. The response document may be ingested for training the ML labeling subsystem 130 to recognize sections, generate labels for the sections, and assign weighted attributes to the sections for automated response generation to respond to requirement specifications.

The response document 11 may be in various file proprietary or open formats, such as Portable Document Format (PDF), MICROSOFT OFFICE FORMATS (such as .DOCX, .XLSX, .PPT files), email content (including any attached binary files), text files, and/or other types of formats. The response document 11 may include various types of documents that were previously prepared to respond to a requirement specification. For example, the document types may include RFP Responses, Request for Information (RFI) Responses, Request for Quote (RFQ) Responses, previously generated White Papers, Marketing Materials, Engineering Notes, Project Status Reports and Summaries, Email text forwarded to the Artifact Collector, and/or other types of content.

Unstructured requirement data 13 (illustrated as unstructured requirement data 13A-N) may also be staged for ingestion by the ingestion subsystem 120. The response document 13 may include prior requirement specifications that elicit responses thereto. The unstructured requirement data 13 may be ingested for training the ML labeling subsystem 130 to recognize discrete requirements associated with requirement specifications. The unstructured requirement data 13 may be in various proprietary or open file formats, similar to the file formats of the response document 11.

The unstructured requirement data 13 may include various types of documents that elicit responses. For example, the document types may include Procurement RFPs, Procurement RFIs, Procurement RFQs, RF(X) Packages, Section L: Instructions, Conditions and Notices, Section M: Evaluation and Weighting Factors for Award, Statement of Work (SOW) Section, Performance Work Statement (PWS) Section, Bid Library Material Supplied by Procurement Agency, Procurement White Paper Request documents, Commercial procurement bid requests, and/or other types of content.

To ingest the unstructured documents (such as response documents 11 and requirement documents 13), the ingestion subsystem 120 may include a data connector API 220. The data connector API 220 may connect to response document sources 101 and unstructured requirement data sources 103 via Java Database Connectivity (JDBC), Representational state transfer (RESTful) services, Simple Mail Transfer Protocol (SMTP) protocols, direct file upload, and/or other file transfer services or techniques. In particular, the data connector API 220 may include a MICROSOFT SHAREPOINT API Connector, an Hyper Text Transfer Protocol (HTTP)/HTTP-secure (HTTPS), a Network Drive Connector, a File Transfer Protocol (FTP) Connector, SMTP Artifact Collector, Object Store Connector, MICROSOFT ONEDRIVE Connector, GOOGLE DRIVE Connector, DROPBOX Connector, and/or other types of connector interfaces. If any metadata is associated with any ingested unstructured data, the binary file and associated metadata may be stored in association with one another in the document object store 111.

Figure 3:
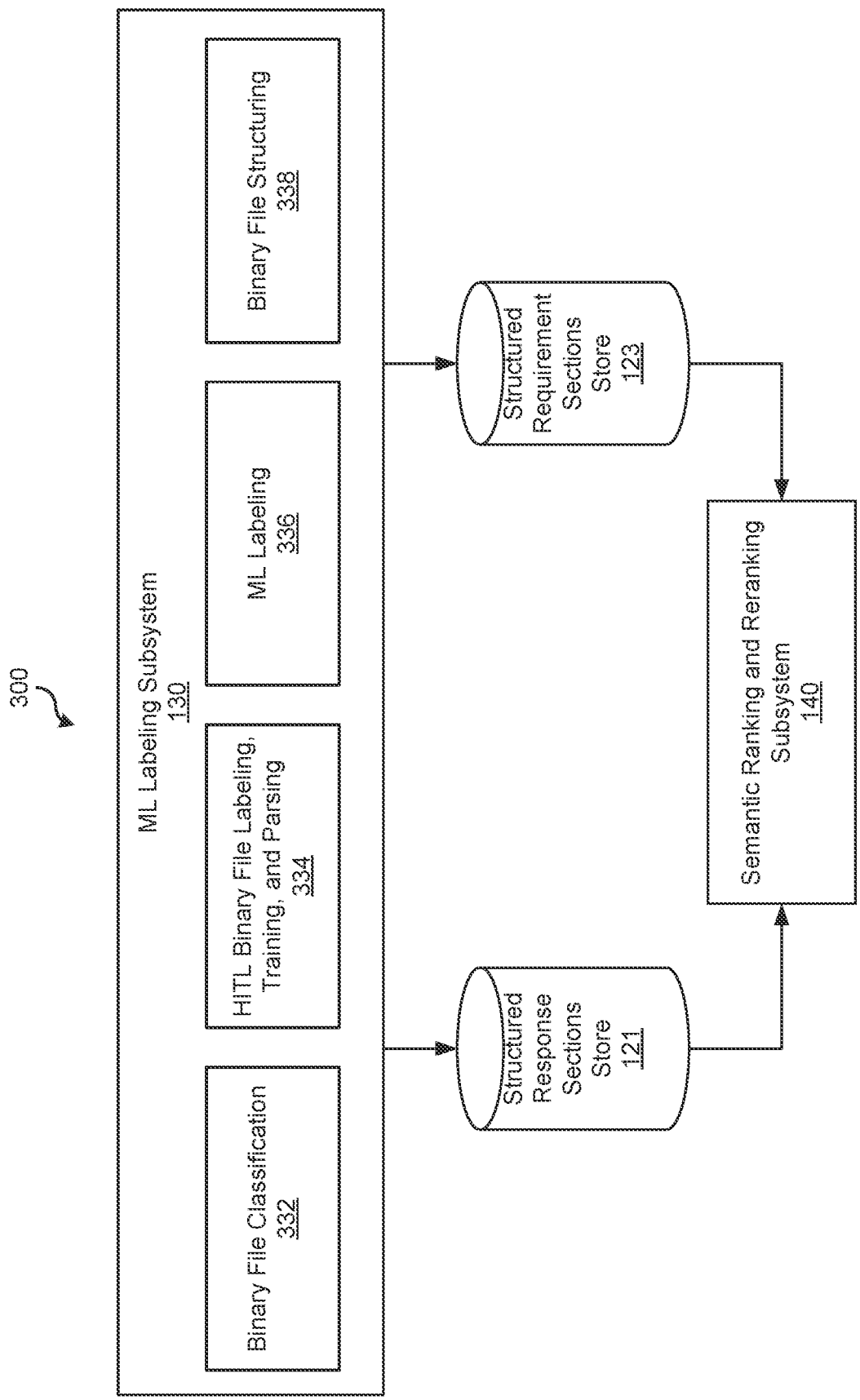
FIG. 3 shows an example of labeling the unstructured data to train a machine learning model that learns to structure data for identifying relevant content for the deep learning AI language model, according to an implementation.

Once unstructured data is ingested, the ML labeling subsystem 130 may transform the unstructured data into structured data, with labeled text components. For example, FIG. 3 shows an example of labeling the unstructured data to train a machine learning model that learns to structure data for identifying relevant content for the deep learning AI language model 155, according to an implementation.

The ML labeling subsystem 130 may include various features that facilitate labeling and weighted attribute assignment. For example, the ML labeling subsystem 130 may include binary file classification 332, Human-in-theloop (HITL) binary file labeling, training, and parsing 334, ML labeling 336, binary file structuring 338, and/or other features.

Binary file classification 332 may classify and label the type and category of data ingested into the document object store 111. For example, the binary file classification 332 may extract metadata that may be extracted by the ingestion subsystem 120. Alternatively or additionally, the binary file classification 332 may use regular expression matching to identify the type and category of the data. For example, certain types and categories of documents may be identified through a regular pattern found in a filename, header content, or other aspect of the documents. The binary file classification 332 may use regular expressions to match the regular patterns.

HITL binary file labeling, training, and parsing 334 may include extracting a subset of representative documents from the document object store 111 so human annotators may associate labels and attributes of the document structure and layout to train an active machine learning model that can process documents at scale. Attention is paid to the table of contents, list of tables, list of figures, subtitles through the document that identify the content of the associated paragraphs, the graphics and associated graphic figure descriptions, and the requirements descriptions contained in external proposal documents. This process is repeated against other representative documents across each category of documents. The labeling process is implemented in the user interface provided by the user interface subsystem 170 so that structured attributes associated with the proposal process are first associated to the appropriate and corresponding text may be structured for storage in a Relational Database Management System (RDBMS), such as the structured response sections store 121 and the structured requirement sections store 123. Structured attributes that are associated with the structured response sections labeled herein may include attributes listed in table 1 below.

Table 1. Structured response attributes used for weighted attribute re-ranking and their corresponding datatypes. It should be noted that this listing of attributes and their data types is for illustrative purposes. Other attributes and data types may be used in addition or instead of any of those listed in Table 1.

| Attribute | Data type | Primary Semantic Rerank Relevance | Secondary Semantic Rerank Relevance |
|---|---|---|---|
| Source System Metadata | JSON array | 6 | 0 |
| Binary File Metadata | JSON array | 4 | 0 |
| Document Layout & Relationships | JSON array | 0 | 6 |
| Extracted Text | String | 9 | 0 |
| Number of document edits and track change comments | String | 0 | 5 |
| Document & Section Summaries | String | 9 | 0 |
| Extracted Keywords & Topics | String | 7 | 0 |
| Level of Effort Assignment Labeling | Numeric | 0 | 6 |
| Number of general-purpose proposal writers | Numeric | 0 | 4 |
| Number of technical writers | Numeric | 0 | 5 |
| Number of solutions architects assigned | Numeric | 0 | 6 |
| Number of "color" reviews | Numeric | 0 | 3 |
| Number of "color" review team members | Numeric | 0 | 4 |
| Procurement agency review and evaluation feedback ratings | Numeric | 0 | 9 |
| Won or Lost/Success Factor | Boolean | 0 | 6 |
| Internal post delivery assessment | Numeric | 0 | 5 |

ML labeling 336 may use a machine learning model trained to identify and label sections of an unstructured document such as a response document 11 or a requirement specification 13. For example, the machine learning model may be trained on a subset of response document 11 in the document object store 111. The subset may be analyzed by human annotators, who may identify sections and assign labels to each section. Once the subset has been labeled by human annotators, the machine learning model may be applied to other response document 11 in the document object store 111 that is not in the subset. The machine learning model may then identify and label sections in the other response document 11 in the document object store 111. Automatically identified and labeled sections may be rechecked by human annotators, which may facilitate reinforcement learning based on human input.

To learn how to label sections based on human-annotated sections, an embedding space based on the human-annotated sections may be generated. For example, a word embedding based on text from the human-annotated sections may be generated. A word embedding refers to a computationally-learned representation of individual words or terms, processable by the computer system 110, from the human-annotated sections. The machine learning model may correlate the word embeddings with the labels. Some examples of machine learning models that may be used to generate word embeddings, include, but are not limited to, (which is not to imply that other lists are limiting), Word2Vec, Continuous Bag-of-Words (CBOW) model, Continuous Skip-Gram Model, Global Vectors for Word Representations (GloVe) model, Latent Semantic Analysis (LSA), Bidirectional Encoder Representations from Transformers (BERT), or other machine learning models.

The machine learning model may generate a vector representation (such as a feature vector) of text in an unstructured document to be labeled. Each feature vector may be N-dimensions in size, where each dimension refers to a feature of the word. The number of dimensions of the feature vector may be defined by the machine learning model. In some examples, the number of dimensions of the feature vector may depend on a given section of an unstructured document. Put another way, in some implementations, the number of dimensions may be correlated with the number of sections of the unstructured document.

A word embedding from the human-annotated and labeled sections may be compared to the word embeddings generated from the remaining portions of the unstructured documents. Based on the comparison, a similarity metric between the compared word embeddings may be generated to determine whether an event item has content that is similar to content previously deemed to be relevant to a domain of interest (or domain-specific topic of interest). The similarity metric may include a cosine similarity metric, a Levenshtein distance or edit distance metric, or other metric for determining the similarity of text based on word embeddings.

The output of the machine learning model may be a parsed, structured, and normalized data that describes each one of the documents and contains arrays for extracted text, table, graphics, and/or other types of content and the relations between the table of contents and subtitles (paragraph headings). The output may further include discrete requirements extracted from a requirement specification. In some implementations, the output may include a structured data file, such as a JavaScript Object Notation (JSON) file. In some implementations, the output of the machine learning model may be verified by the human annotators to provide further feedback learning for the machine learning model.

In some implementations, the machine learning model may identify graphical content such as images or other graphics through edge detection. For example, the machine learning model may identify the edge coordinates of each image, and extract the binary content based on the edge coordinates. The machine learning model may associate the image with its description and content adjacent to the image, such as the leading and trailing paragraphs of the image.

Ingested data may be continuously labeled as new unstructured data is added to the document object store 111. As such, the ingestion subsystem 120 and the ML labeling subsystem 130 is an iterative process that combines the accuracy of human labeling and auto annotation to continuously improve the machine learning model to arrive at a process where the document understating active machine learning model can be fully automated against the entire corpus of the response document.

Binary file structuring 338 may stream the labeled response document in a structured format such as HTML and JSON to the structured response sections store 121 and stream the labeled requirement data to the structured requirement sections store 123. It should be noted that the structured response sections store 121 and the structured requirement sections store 123, while illustrated as separate databases, may be combined into a single database.

The output of binary file structuring 338 is a parsed, structured, and normalized JSON file that describes each one of the documents and contains arrays for extracted text, table and graphics, the relations between the table of contents and subtitles (paragraph headings), and the novel requirements extracted from external procurement data. The JSON contains the binary content of the graphics by first identifying the edge coordinates of each graphic, extracting the binary content by the edge coordinates, and associating the graphical figure description, as well as the leading and trailing paragraphs associated to the extracted graphic. The structured JSON output may include fields that identify independent source JSON files as either response sections or requirement sections.

Figure 6A:
FIG. 6A shows an example of an upload interface that receives a requirement specification, according to an implementation.

The External Documents User-Defined Labeling Service is utilized to label, parse and export publicly available external procurement documents and data. This process identifies the document layout and structure of the available external procurement material (list of material and process detailed above in corresponding section) and creates discrete sections stored in the JSON as an array of novel requirements. In some implementations, the system may receive an upload of a requirement specification that contains one or more requirements and create a writing matrix from the uploaded document. FIGS. 6A-6C illustrate various interfaces for receiving a requirement specification 13. This array is associated to the ID of any given procurement and stored in the RDBMS. Each discrete section of the JSON array contains the requirement number and the description of the requirement (any explanatory or descriptive text associated with the new requirement from the procuring agency).

Figure 4:
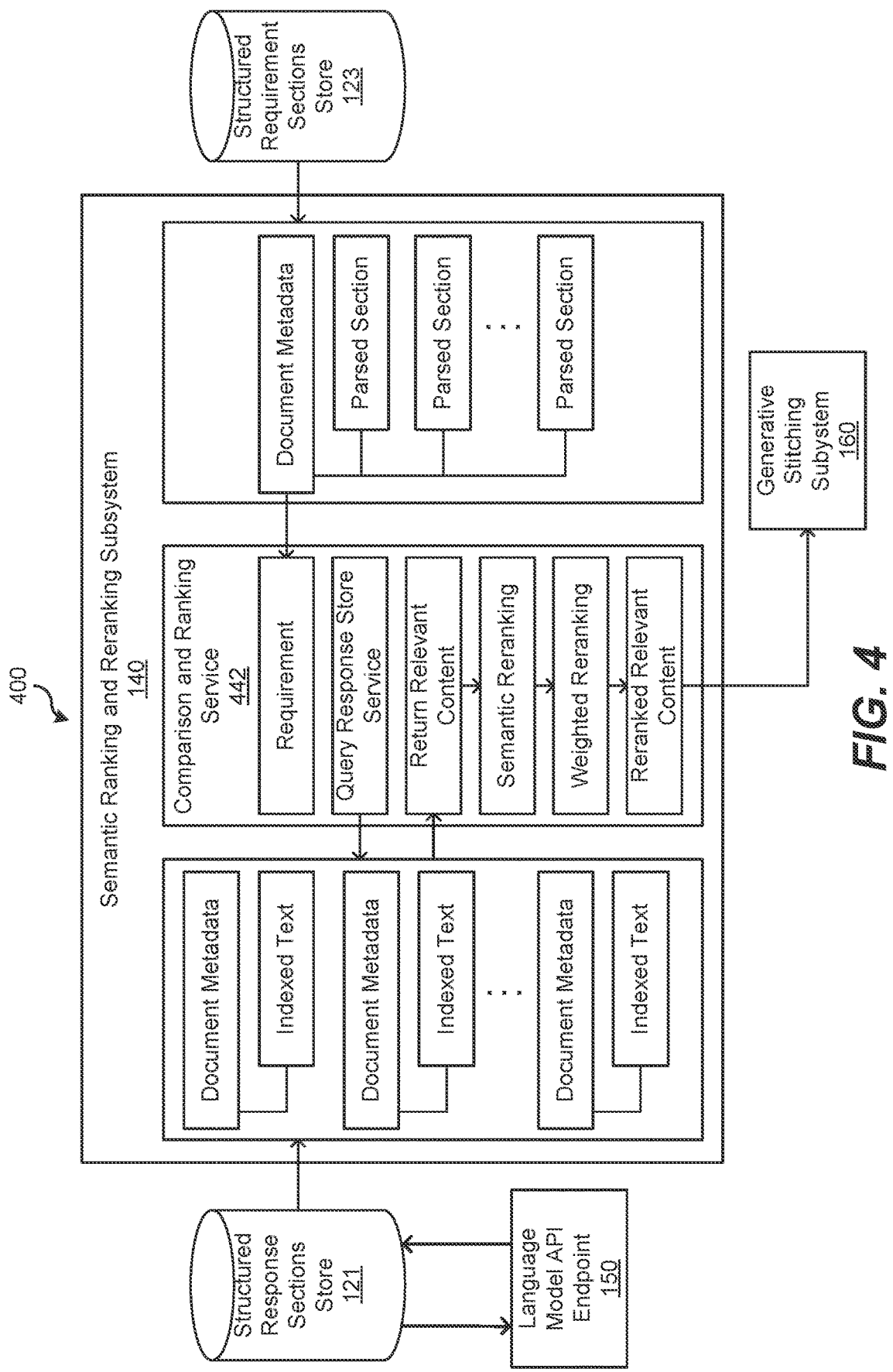
FIG. 4 shows an example of semantically re-ranking relevant structured data and re-ranking again based on attributes learned by the machine learning model to generate a language model writing matrix for the deep learning AI language model, according to an implementation.

FIG. 4 shows an example of semantically re-ranking relevant structured data and re-ranking again based on attributes learned by the machine learning model to generate a language model writing matrix for the deep learning AI language model, according to an implementation.

The semantic re-ranking and weight re-ranking subsystem 140 may include a comparison and ranking service 442. The comparison and ranking service 442 may receive a specification identifier that identifies a requirement specification that has already been transformed for processing. In this example, the comparison and ranking service 442 may obtain one or more discrete requirements, which may include the requirement identifier, requirement name, and requirement description. In some implementations, the comparison and ranking service 442 may receive a requirement specification that is to be transformed, in which case the ML labeling subsystem 130 may be invoked to obtain the discrete requirements from the requirement specification.

In whichever manner the comparison and ranking service 442 obtains discrete requirements of a requirement specification, the comparison and ranking service 442 may transform the structured fields (requirement id, requirement description) to generate an RDO. The comparison and ranking service 442 may present the RDO via a generative writing interface presented by the user interface subsystem 170. The generative writing interface may therefore display unique and discrete writing tasks to the user in the form of a task list that may include the requirement identifier, requirement name, requirement description, and/or other data relating to one or more discrete requirements of the requirement specification.

The generative writing interface may receive, from a user, modifications to the RDO. For example, via the generative writing interface, the user may modify the requirement ID, requirement name, requirements description, and/or other data relating to one or more discrete requirements of the requirement specification. Such modifications may include adding content (such as words, phrases, graphics), removing content, or changing content. The modifications may further include re-ordering the order of the discrete requirements (if more than one), adding a discrete requirement, and/or removing a discrete requirement. For instance, the generative writing interface may include receiving, to be inserted into the language model writing matrix, general proposal content writing tasks widely used and accepted across industries or across the specific customer user base, such as inserting writing tasks for executive summaries, general description of company or teammate companies and their capabilities, and summary content.

In some examples, the generative writing interface may receive inputs for assigning different users with specific writing sections or writing requirements. For example, a user may assign, via the generative writing interface, a specific user to be tasked with responsibility for specific writing sections or writing requirements. User responsibility may include manually writing response content or overseeing automatically generated response content. Thus, a given response may include completely automatically generated response content or partially automatically generated response content in which case at least some response content is manually written and combined with the partially automatically generated response content.

In some examples, the generative writing interface may receive free-form content that may influence automatic generation of response content. For example, the generative writing interface may receive comments and free form text that describes a user's approach to responding to any given requirement, a collection of win theme content or pricing strategies that help inform the generation of textual content, and/or other information from a user that may influence automatic generation of response content. The generative writing interface may add the received free-form content to the RDO.

The language model API endpoint 150 may expose a search service of the language model 155. The search service may search against documents provided to it. The comparison and ranking service 442 may provide content from the structured response sections store 121 to the search service for evaluating a search query. The comparison and ranking service 442 may include a query response store service that appends the structured requirement name and description with text to generate a search query. Each discrete requirement may therefore be associated with a search query that is evaluated against the search service.

The search service is not a keyword search typically implemented in precision search and recall applications, rather a natural language query approach that identifies the structure and concept of the language used in the query to return semantically ranked results against the understanding of the parsed language and concepts in the search prompt. The search service returns relevant output that includes a set of ranked document matches, scored based on how semantically related they are to the natural language transformer understanding of the initial input query. The service provides semantic ranking as an extension of the query execution workflow intended to improve precision search and recall by semantic re-ranking of the relevant content of the first initial relevant content document list.

The comparison and ranking service 442 may obtain, from the search service, the most relevant content discovered across the large language model search index that has been pre-populated with data from the structured response sections store 121.

Once semantically re-ranked, the comparison and ranking service 442 may apply weighted attributes provided from the ML labeling subsystem against the semantically re-ranked content and completes a secondary re-ranking that accounts for variables determined to have positive outcomes against discrete requirements from a requirement specification that for which a response is to be automatically generated. The list of attributes that are weighted may include some or all of the attributes listed in Table 1, such as Level of Effort Assignment Labeling (Numeric), Number of General-Purpose Proposal Writers Assigned (Numeric), Number of Technical Writer Assigned (Numeric), Number of Solution Architects Assigned (Numeric), Number of Edits from binary document metadata (Numeric), Number of Color Review Teams (Numeric), Number of Color Review Team Members (Numeric), Procurement Agency Review/Evaluation Feedback labels (string), Won or Lost Success factor (Boolean), Return of Relevant Content based on Weighted Re-ranking, and/or other attributes. The output of the semantic re-ranking and weighted attribute re-ranking may be re-ranked relevant content, which is provided to the generative stitching subsystem 160 for automatic content generation.

Figure 5:
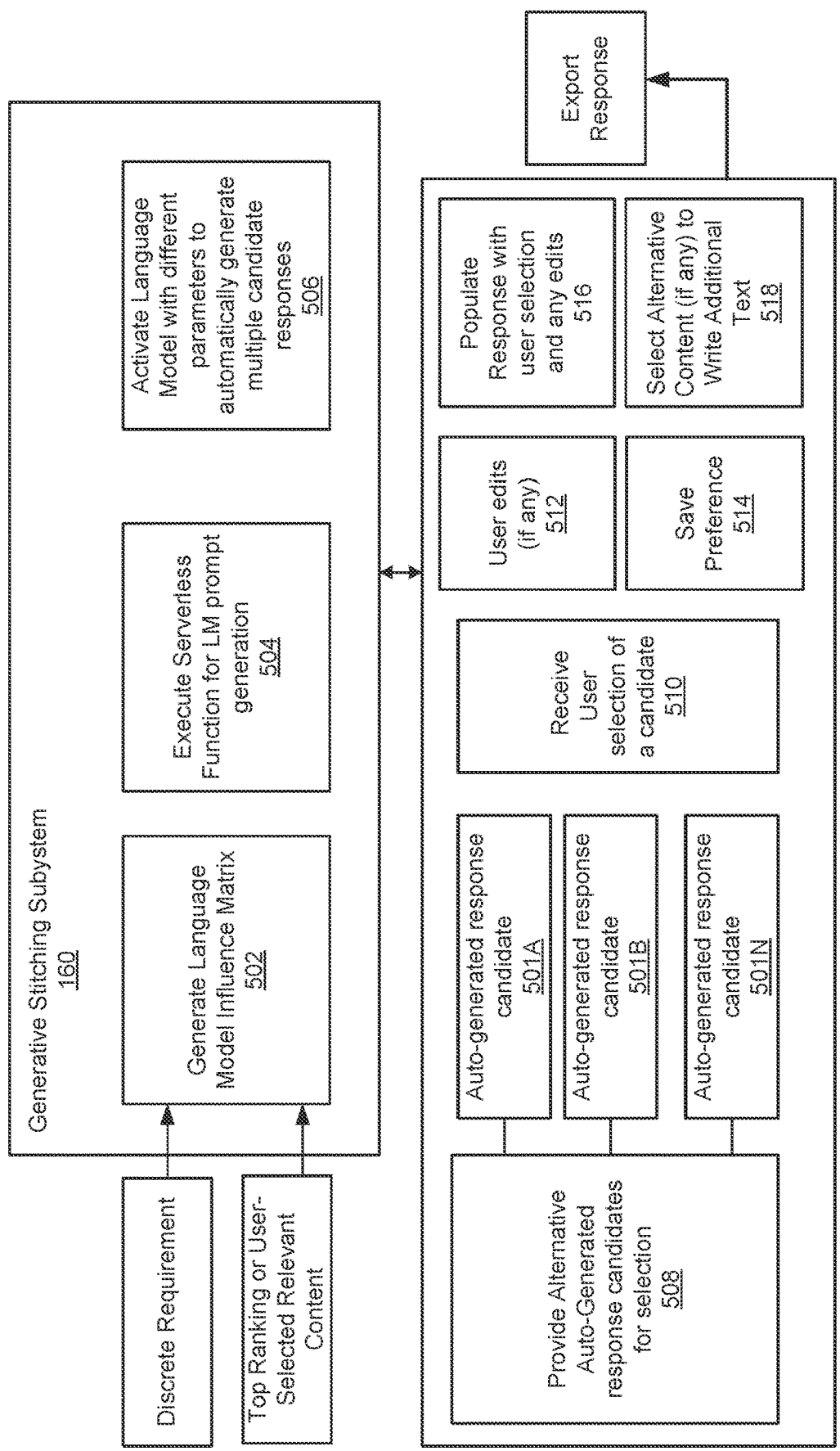
FIG. 5 shows an example of a generative stitching subsystem and interface subsystem for invoking the deep learning AI language model and generating a response document having unique natural language text based on the language model writing matrix, according to an implementation.

FIG. 5 shows an example of a generative stitching subsystem 160 and interface subsystem 170 for invoking the deep learning AI language model and generating a response document having unique natural language text based on the language model writing matrix, according to an implementation. It should be noted that the following data flow of the generative stitching subsystem 160 may be repeated serially or in parallel for each discrete requirement in the requirements matrix (which was derived from a requirement specification for which a response will be automatically generated) to automatically generate content including natural language text.

At 502, the generative stitching subsystem 160 may receive re-ranked relevant content (such as the output of the semantic re-ranking and weighted re-ranking subsystem 140) and a discrete requirement for which the re-ranked relevant content was identified. It should be noted that the re-ranked relevant content may be the top-ranking content from among a plurality of re-ranked relevant contents outputted by the semantic re-ranking and weighted re-ranking subsystem 140 or may be a user-selected one of the plurality of re-ranked relevant contents. The generative stitching subsystem 160 may compare the discrete requirement with the re-ranked relevant content.

At 504, the generative stitching subsystem 160 may execute a serverless function to automatically generate a language model writing matrix. For example, the generative stitching subsystem 160 may use regular expression techniques to recognize and replace strings in a textual prompt template with corresponding text from the discrete requirement and text from the re-ranked relevant content to generate the language model writing matrix. Accordingly, the language model writing matrix may reflect language entities and semantics from the discrete requirement and the re-ranked relevant content with implicit directions on how to modify the request sent to the language model 155 to automatically generate proposal response text.

For example, a set of LLM prompts may be generated to execute in a serial fashion after a dot product comparison value is retrieved between the N vectors in the result and the M vectors contained in the new requirement, where N and M are integers. In some examples, N and M are each 12000. Depending on the delta between the two items being compared (was it a high dot product score vs was the distance greater than is typical), the generative stitching subsystem 160 may modify the prompt chaining sequence or modify the prompts (also referred to as prompt engineering) to expand on the original concepts in the requirement, or create a list of new ideas to expand upon that match the language in both the requirement and the result prior to finalizing the chain with a prompt that asks the LLM to "rewrite the returned resulting language to respond to the new requirement".

At 506, the generative stitching subsystem 160 may activate the language model 155 through the language model API endpoint 150. For example, the generative stitching subsystem 160 may make an API call using the language model writing matrix as an input prompt for the language model 155. The generative stitching subsystem 160 may activate the language model 155 a plurality of instances, each instance having a respective temperate parameter value. A temperature parameter of the language model 155 may be used to adjust the level of randomness for the automatically generated text. Thus, different values of the temperature parameter will result in different levels of randomness in the generated text. For example, the generative stitching subsystem 160 may activate the language model 155 a first time with a first temperature parameter value and a second time with a second temperature parameter value, resulting in first automatically generated response candidate 501A for based on the first temperature parameter value and a second automatically generated response candidate 501B based on the second temperature parameter value. Other numbers of instances may be activated using other temperature parameter values to generate other automatically generated response candidates 501N. In some examples, two instances may be run, in which the first temperature parameter value is within a range of 0.2-0.4 and the second temperature parameter value is within a range of 0.5-0.8.

At 508, the generative stitching subsystem 160 may provide the alternative automatically generated response candidates 501A-N for selection via the generative stitching interface.

At 510, the generative stitching subsystem 160 may receive a user selection of one of the automatically generated response candidates 501A-N.

In some implementations, at 512, the generative writing interface may provide an input area for the user to modify the selected automatically generated response candidate 501. Modifications may include adding, removing, or otherwise changing the content of the selected automatically generated response candidate 501. For example, a user may add one or more words, remove one or more words, or otherwise change one or more words in the selected automatically generated response candidate 501.

At 514, the generative stitching subsystem 160 may save the selected automatically generated response candidate 501 (including any edits made at 512) for learning and adding to the corpus of response text. For example, the selected response candidate 501 may be saved in the structured response sections store 121, which may be propagated to the search service of the language model 155 for fine-tuning future relevant content identification and re-ranking. For example, the natural language text in the selected response candidate 501 may itself be used as a basis for subsequently searching for content that is semantically similar to discrete requirements (of another requirement specification, for example). In some implementations, the selected response candidate 501 may be stored in connection with the RDO so that the result of the response may be tracked and any attributes, such as feedback information, may be associated with the selected response candidate 501.

At 516, the generative stitching subsystem 160 may populate a response document with the selected automatically generated response candidate 501 (including any edits made at 512). In some implementations, the user is provided functionality that allows them to iterate through many paragraphs (matched paragraph, leading paragraph, trailing paragraph) from the most relevant content list, and select on N number of paragraphs to execute the generative stitching process (502-518). This efficiently and quickly generates N number of autogenerated paragraph(s) against any requirement from the RDO. By providing the generative stitching interface functionality to select alternate internal content the service orchestrates the repeatable generative stitching process and methodology to autogenerate textual content at a rate in which cannot be achieved by humans.

At 520, when the response is populated with the selected automatically generated response candidate 501, the generative stitching subsystem 160 may mark the RDO for the corresponding requirement complete.

The generative stitching subsystem 160 may repeat 502-518 for each requirement in the RDO. Furthermore, the user many be able to return to, and page through the candidate response list to select additional content to re-populate the language model writing matrix prompt to return more autogenerated text for selection. This may happen serially based on user selection through the ordered list of requirements in the RDO or in an unordered way. In an unordered way, the user is provided functionality to work on any given requirement in the RDO by clicking on a discrete novel requirement section in the list of available sections, an example of which will be illustrated in FIG. 6D.

At 520, the user is provided the functionality to "save draft text" or "mark section complete" from the autogenerated and human edits content inserted into the editable writing area. If a novel requirement section of the RDO is indicated as "save draft text" it does not mark the section complete and the status indictor for the novel requirement section indicates as in-progress status. Alternatively, if the user selects the "mark section complete" button the system indicates a complete progress status. If a user has not modified the initially autogenerated text or initiated the repeatable generative stitching process than the section is marked as "not reviewed".

The generated response document may include the selected automatically generated response candidate 501 for the corresponding requirement and other candidates that were selected for other requirements in the RDO. The generated response document may be in various formats, such as ADOBE PORTABLE DOCUMENT Format (.pdf extension), MICROSOFT WORD Document (.docx), MICROSOFT EXCEL Spreadsheet (.xlsx), text file where there are no graphics (.rtf or .txt extensions), or other formats.

The generated response document may include the requirement ID, the requirement name, the requirement description, the collection of autogenerated textual content, the collection of edits made by a human against the autogenerated textual content and the references that link the autogenerated and human edited paragraphs back to the original source content contained in the system document object store 111.

FIG. 6A shows an example of an upload interface 600A that receives a requirement specification 13, according to an implementation. Using the upload interface 600A, a user may upload a requirement specification 13 at an input portion "Upload a Requirements Document Here." In this way, any requirement specification 13 may be uploaded for extracting one or more requirements to generate an RDO. FIG. 6B shows an example of an requirements interface 600B that shows requirements obtained from a requirement specification, according to an implementation. Requirements interface 600B shows the contents of an automatically-generated RDO generated by processing the requirement specification 13 by the ML labeling subsystem 130. For example, ML models specific to Statement of Work, Performance Work Statements, RFI requests, and/or other types of requirement specification 13 may be used to determine the requirements. FIG. 6C shows an example of an annotation interface 600C that receives one or more user annotations to adjust a requirements driven outline based on a requirement specification, according to an implementation. Using the annotation interface 600C, a user may adjust and customize the RDO. For example, using the "Annotation Settings," a user may select (and the system may receive) a section of the RDO to annotate. Using the "Requirement ID & Name" section, a user may modify the selected section of the RDO and the system may receive the annotations to update the RDO. In this manner, via the user interfaces 600A, 600B, and 600C, a user may be able to upload and view a requirement specification 13 (including any original binary document), manually annotate one or more requirements—including adding new text for new requirements, edit each requirement name and description, move the order of items in requirements list, write additional comments on each of the requirements, assign each discrete requirement as a writing assignment to other organization application users, and/or modify the RDO and therefore resulting response document.

Figure 6D:
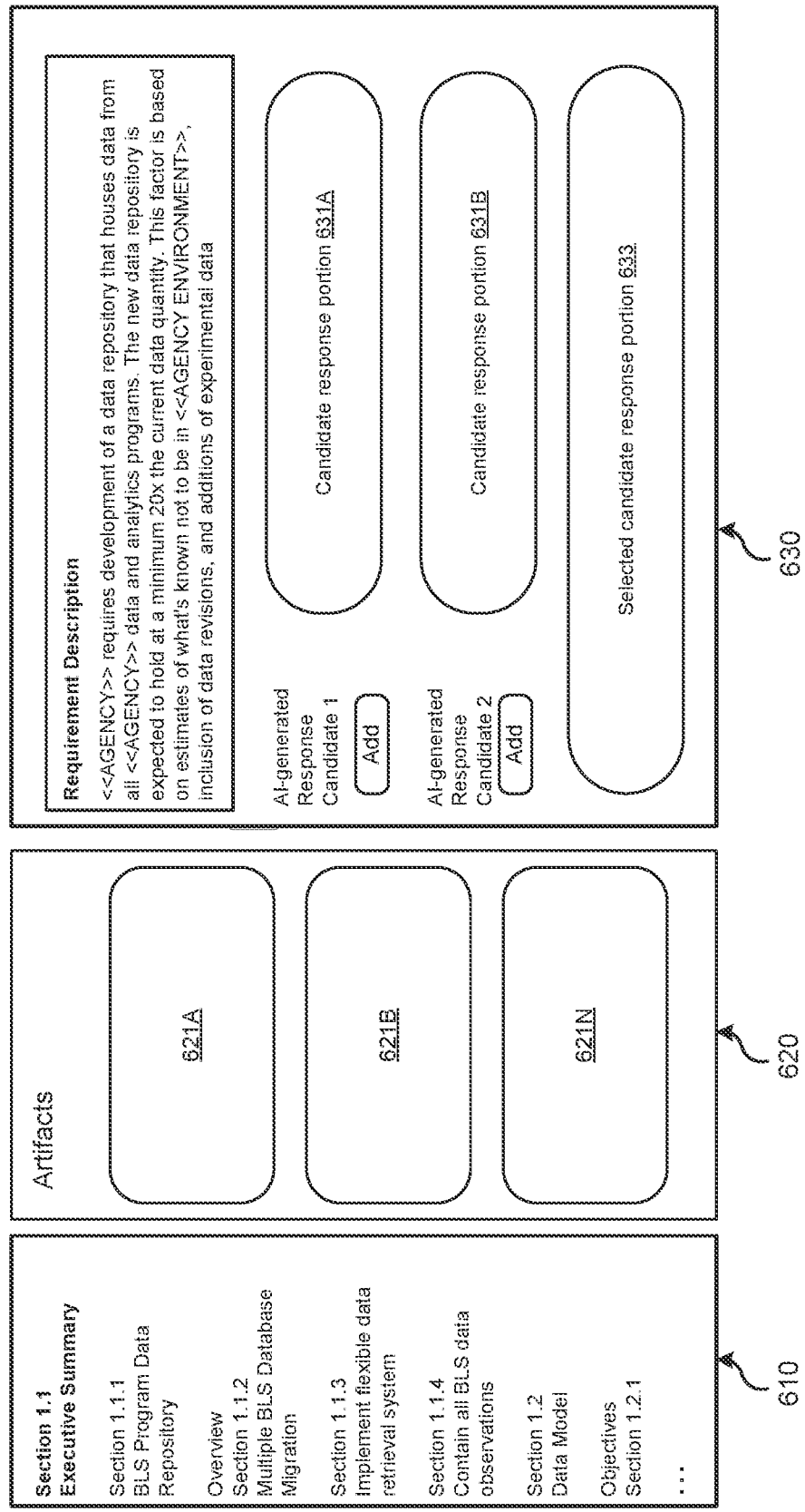
FIG. 6D shows an example of a generative stitching interface to generate the response document, according to an implementation.

FIG. 6D shows an example of a generative stitching interface 600D to generate the response document, according to an implementation. It should be noted that various features shown in in the generative stitching interface 600D are for illustrative purposes only. Some features may be omitted or otherwise changed while other features may be added.

As shown, the generative stitching interface 600D may have different interaction areas 610, 620, and 630. Interaction area 610 may show a listing of different sections identified from a requirement specification for which a response document is to be automatically generated. Interaction area 620 may show a listing of artifacts. Each artifact represents response portions that may be semantically relevant to a requirement of a selected section in the interaction area 610. For illustrative clarity, Table 2 is provided below to show examples of artifacts 621A-N.

Table 2. Examples of artifacts that may be displayed in interaction area 620.

| Interaction area | Displayed content |
|---|---|
| 621A | SOW Response for <<AGENCY CUSTOMER>>.pdf<br>November 2021 96.26%<br>Rating: EXCELLENT PursuitLOE: SIGNIFICANT<br><<COMPANY NAME>> proposes using an AI-enabled data management tool suite to centralize, integrate and secure internal and external data sources where simple and complex models can be tested, productionalized and secured. The integrated tool suite is a collection of commercial and open source . . . |
| 621B | Integrated Data Sources White Paper for <<AGENCY>>.pdf<br>October 2021<br>Rating: NO WEAKNESSES PursuitLOE: 92.55% SIGNIFICANT<br><<COMPANY NAME>>'s data management processes are built-in technical approaches which will be used to manage the <<AGENCY SYSTEM>> prediction critical data, utilizing technology processes that include Extract, Transform, Load (ETL), ingest algorithms, data integration techniques, stream and migration automation and . . . |
| . . . | . . . |
| 621N | <<AGENCY>> Master Data Management RFP Respnse.pdf<br>October 2021 8~21%<br>Rating: NO WEAKNESSES PursuitLOE: LOW<br><<COMPANY NAME>> Data Governance processes track and report the overall management of the availability, usability, integrity and security of data used in the <<CUSTOMER REFERENCE>> integrated data tool environment. <<AGENCY>> will benefit from built-in data governance processes in our data management approaches because it ensures analytic and MA . . . |

Interaction area 630 may show the discrete requirement for the selected section as well as selectable candidate response portions that were automatically generated. As shown, two alternative candidate response portions 631A and 631B are provided. For example, the generative stitching subsystem 160 may have activated the language model 155 twice: once with a first temperature parameter value and once with a second temperature parameter value. Selection of a candidate response portions 631A and 631B via the "Add" button may cause the selected candidate response portions to be displayed at the selected candidate response portion 633.

Figure 7:
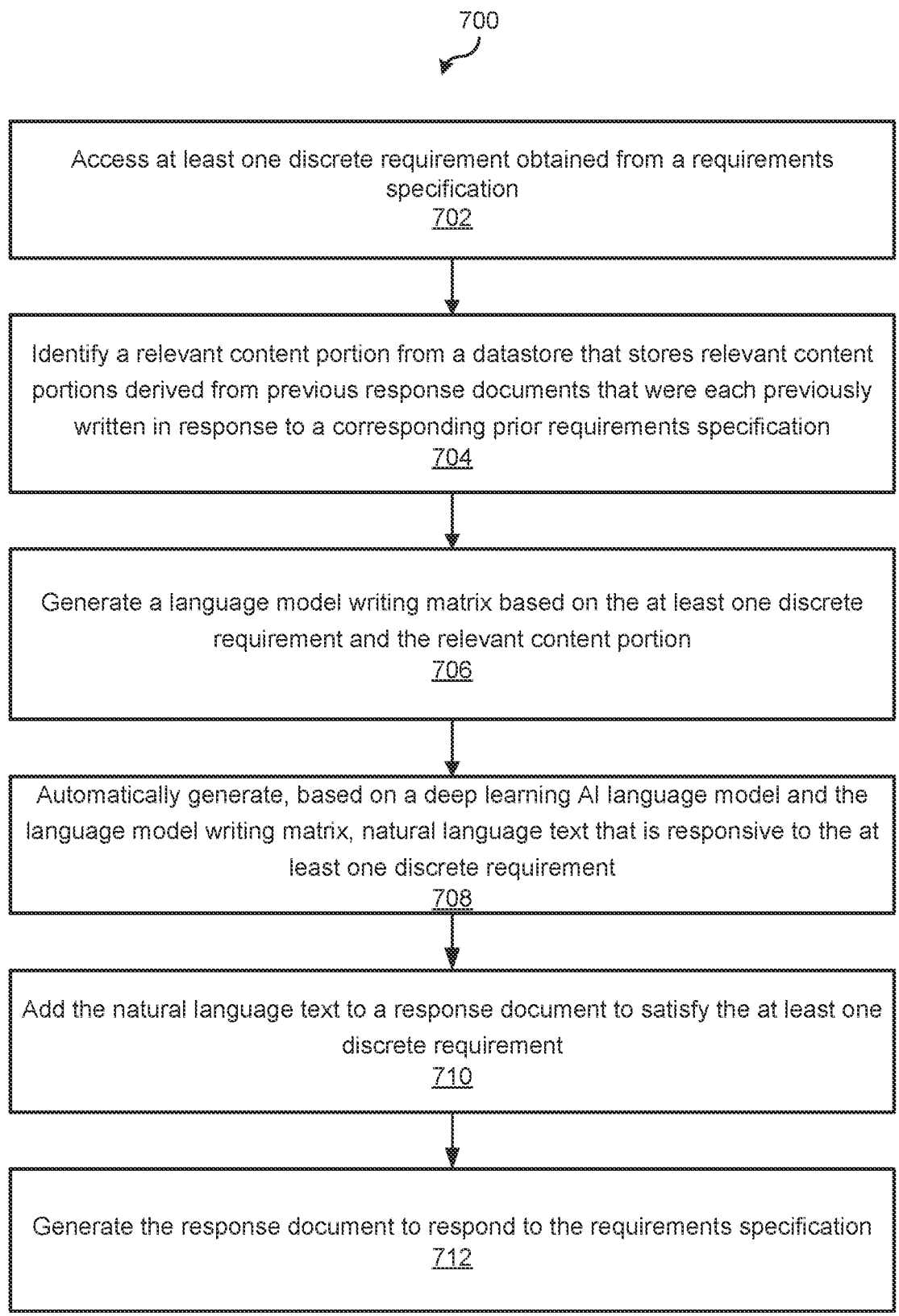
FIG. 7 shows an illustrative method for automatically generating unique natural language text that satisfies a requirement specification based on a deep learning AI language model, according to an implementation.

FIG. 7 shows an illustrative method 700 for automatically generating unique natural language text that satisfies a requirement specification based on a deep learning AI language model, according to an implementation.

At 702, the method 700 may include accessing at least one discrete requirement obtained from a requirement specification, such as a requirement specification 13.

At 704, the method 700 may include identifying a relevant content portion from a datastore that stores relevant content portions derived from response documents (such as response documents 11) that were each previously generated in response to a corresponding prior requirement specification.

At 706, the method 700 may include generating a language model writing matrix based on the at least one discrete requirement and the relevant content portion.

At 708, the method 700 may include automatically generating, based on a deep learning AI language model and the language model writing matrix, natural language text that is responsive to the at least one discrete requirement.

At 710, the method 700 may include adding the natural language text to a response document to satisfy the at least one discrete requirement.

At 712, the method 700 may include generating the response document to respond to the requirement specification.

Figure 8:
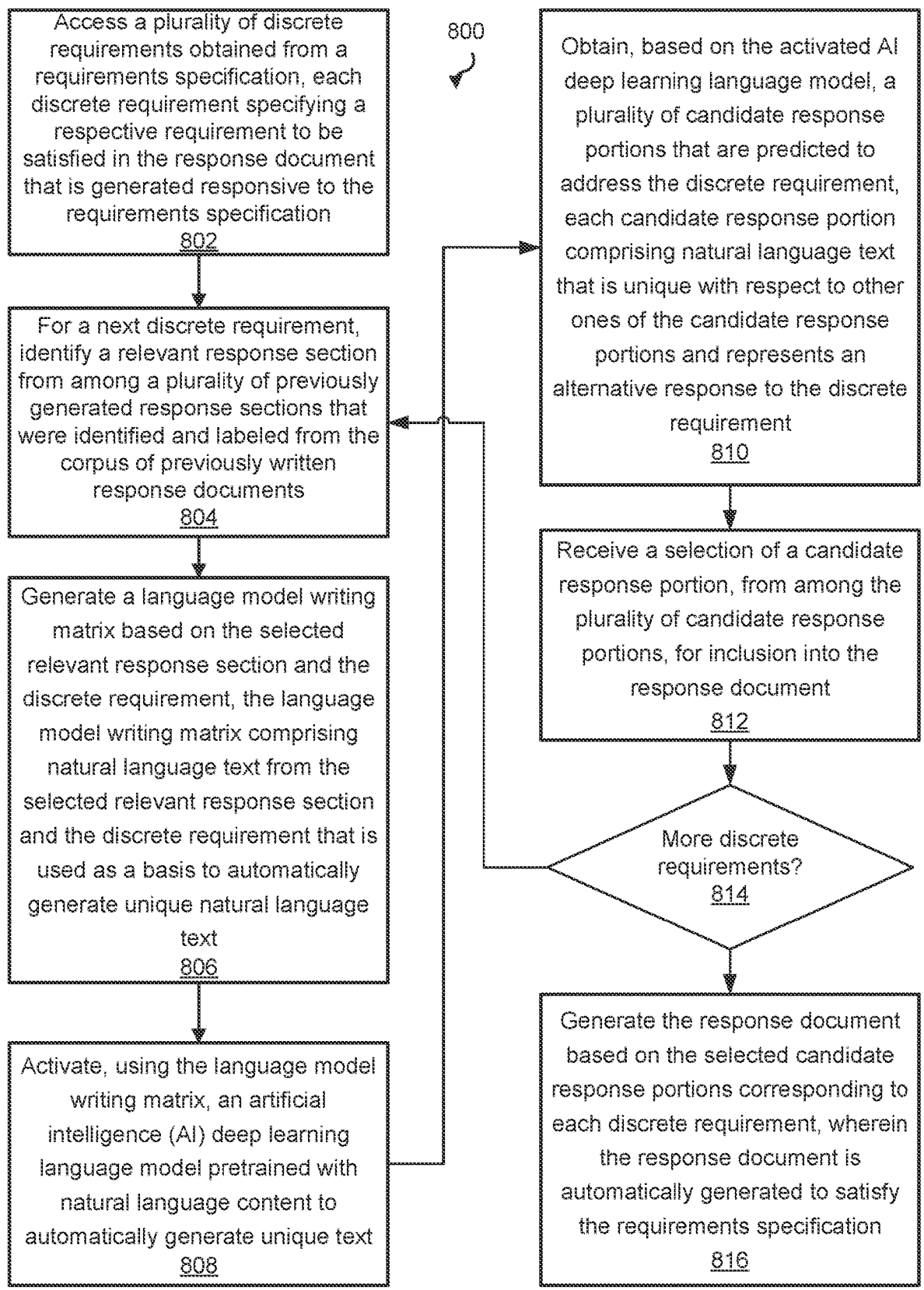
FIG. 8 shows another illustrative method for automatically generating unique natural language text that satisfies a requirement specification based on a deep learning AI language model, according to an implementation.

FIG. 8 shows another illustrative method 800 for automatically generating unique natural language text that satisfies a requirement specification based on a deep learning AI language model, according to an implementation.

At 802, the method 800 may include accessing a plurality of discrete requirements obtained from a requirement specification, each discrete requirement specifying a respective requirement to be satisfied in the response document that is generated responsive to the requirement specification. The method 800 may process 804-814 for each discrete requirement from among the plurality of discrete requirements.

At 804, the method 800 may include identifying a relevant response section from among the previously generated response sections in the datastore. A relevant response section may refer to a response section that was transformed and labeled from a response document 11 and was returned as a result of a semantic query that included text from a discrete requirement.

At 806, the method 800 may include generating a language model writing matrix based on the selected relevant response section and the discrete requirement, the language model writing matrix comprising natural language text from the selected relevant response section and the discrete requirement that is used as a basis to automatically generate unique natural language text.

At 808, the method 800 may include activating, using the language model writing matrix, an artificial intelligence (AI) deep learning language model pretrained with natural language content to automatically generate unique text.

At 810, the method 800 may include obtaining, based on the activated AI deep learning language model, a plurality of candidate response portions that are predicted to address the discrete requirement, each candidate response portion comprising natural language text that is unique with respect to other ones of the candidate response portions and represents an alternative response to the discrete requirement.

At 812, the method 800 may include receiving a selection of a candidate response portion, from among the plurality of candidate response portions, for inclusion into the response document.

At 814, the method 800 may include determining whether there are more discrete requirements to process. If yes, the method 800 may include returning to 804. If not, the method 800 may proceed to 816.

At 816, the method 800 may include generating the response document based on the selected candidate response portions corresponding to each discrete requirement, wherein the response document is automatically generated to satisfy the requirement specification.

The computer system 110 and the one or more client devices 105 may be connected to one another via a communication network (not illustrated), such as the Internet or the Internet in combination with various other networks, like local area networks, cellular networks, or personal area networks, internal organizational networks, and/or other networks. It should be noted that the computer system 110 may transmit data, via the communication network, conveying the predictions one or more of the client devices 105. The data conveying the predictions may be a user interface generated for display at the one or more client devices 105, one or more messages transmitted to the one or more client devices 105, and/or other types of data for transmission. Although not shown, the one or more client devices 105 may each include one or more processors.

Each of the computer system 110 and client devices 105 may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionalities described herein.

The databases and data stores (such as 111, 121, 123) may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific implementations described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system features illustrated in FIG. 1.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for automatically generating natural language text for a response document that satisfies requirements in a requirement specification, comprising:

a datastore that stores previously generated response sections that are structured from a corpus of previously generated response documents, the previously generated response sections having been identified and labeled from the corpus of previously generated response documents;

one or more processors programmed to:

access a plurality of discrete requirements obtained from a requirement specification, each discrete requirement specifying a respective requirement to be satisfied in the response document that is generated responsive to the requirement specification;

for each discrete requirement:

identify a relevant response section from among the previously generated response sections in the datastore;

generate a language model writing matrix based on the identified relevant response section and the discrete requirement, the language model writing matrix comprising natural language text from the identified relevant response section and the discrete requirement that is used as a basis to automatically generate unique natural language text;

activate, using the language model writing matrix, an artificial intelligence (AI) deep learning language model pretrained with natural language content to automatically generate unique text;

obtain, based on the activated AI deep learning language model, a plurality of candidate response portions that are predicted to address the discrete requirement, each candidate response portion comprising natural language text that is unique with respect to other ones of the candidate response portions and represents an alternative response to the discrete requirement;

receive a selection of a candidate response portion, from among the plurality of candidate response portions, for inclusion into the response document; and generate the response document based on the selected candidate response portions corresponding to each discrete requirement, wherein the response document is automatically generated to satisfy the requirement specification.

2. The system of claim 1, wherein to identify the relevant response section, the one or more processors are further programmed to:

identify a plurality of relevant response sections from among the previously generated response sections in the datastore;

rank the plurality of relevant response sections with respect to one another based on a semantic similarity to the discrete requirement;

re-rank the ranked plurality of relevant response sections based on one or more weighted attributes associated with each relevant response section; and identify the relevant response section from among the re-ranked plurality of relevant response sections.

3. The system of claim 2, wherein to identify the relevant response section from among the re-ranked plurality of relevant response sections, the one or more processors are further programmed to:

receive a user selection of the relevant response section or select the relevant response section based on a top-ranking one of the re-ranked plurality of relevant response sections.

4. The system of claim 1, wherein the one or more processors are further programmed to:

transmit the language model writing matrix to a client device for presentation via a graphical user interface; and receive, from the client device, one or more modifications of the language model writing matrix to customize automatic text generation based on the one or more modifications, wherein the plurality of natural language response portions are generated by the AI deep learning language model using the modified language model writing matrix.

5. The system of claim 4, wherein the one or more modifications comprise a modification to natural language text in the language model writing matrix.

6. The system of claim 1, wherein the one or more processors are further programmed to:

generate a Requirements Driven Outline (RDO) based on the plurality of discrete requirements, the RDO comprising, for each discrete requirement from among the plurality of discrete requirements: (a) natural language text of the discrete requirement, and (b) a requirement name and/or a requirement identifier associated with the discrete requirement.

7. The system of claim 6, wherein the one or more processors are further programmed to:

transmit the RDO to a client device; and receive, from the client device, a modification to an order of discrete requirements defined in the requirement specifications or a modification to the natural language text of one or more discrete requirements.

8. The system of claim 1, wherein the one or more processors are further programmed to:

store the selection of the candidate response portion or revisions made to the candidate response portion; and fine-tune the language model based on the stored selection of the candidate response portion or revisions made to the candidate response portion.

9. The system of claim 1, wherein the one or more processors are further programmed to:

apply a machine learning model to identify the plurality of response sections from the corpus of response documents, the machine learning model being trained to identify the plurality of response sections from unstructured content in the corpus of response documents to structure the unstructured content.

10. The system of claim 9, wherein the one or more processors are further programmed to:

obtain a training subset of the corpus of response documents;

for each response document in the training subset:

obtain user-annotations of the response document that indicates a label and an attribute for each response section in the response document; and train the machine learning model based on the user-annotations.

11. A method, comprising:

accessing, by one or more processors, a plurality of discrete requirements obtained from a requirement specification, each discrete requirement specifying a respective requirement to be satisfied in a response document that is generated responsive to the requirement specification;

for each discrete requirement:

identifying, by the one or more processors, a relevant response section from among previously generated response sections stored in a datastore;

generating, by the one or more processors, a language model writing matrix based on the identified relevant response section and the discrete requirement, the language model writing matrix comprising natural language text from the identified relevant response section and the discrete requirement that is used as a basis to automatically generate unique natural language text;

activating, by the one or more processors, using the language model writing matrix, an artificial intelligence (AI) deep learning language model pretrained with natural language content to automatically generate unique text;

obtaining, by the one or more processors, based on the activated AI deep learning language model, a plurality of candidate response portions that are predicted to address the discrete requirement, each candidate response portion comprising natural language text that is unique with respect to other ones of the candidate response portions and represents an alternative response to the discrete requirement;

receiving, by the one or more processors, a selection of a candidate response portion, from among the plurality of candidate response portions, for inclusion into the response document; and generating, by the one or more processors, the response document based on the selected candidate response portions corresponding to each discrete requirement, wherein the response document is automatically generated to satisfy the requirement specification.

12. The method of claim 11, wherein identifying the relevant response section comprises:

identifying a plurality of relevant response sections from among the previously generated response sections in the datastore;

ranking the plurality of relevant response sections with respect to one another based on a semantic similarity to the discrete requirement;

re-ranking the ranked plurality of relevant response sections based on one or more weighted attributes associated with each relevant response section; and identifying the relevant response section from among the re-ranked plurality of relevant response sections.

13. The method of claim 11, wherein identifying the relevant response section from among the re-ranked plurality of relevant response sections comprises:

receiving a user selection of the relevant response section or select the relevant response section based on a top-ranking one of the re-ranked plurality of relevant response sections.

14. The method of claim 11, the method further comprising:

transmitting the language model writing matrix to a client device for presentation via a graphical user interface; and receiving, from the client device, one or more modifications of the language model writing matrix to customize automatic text generation based on the one or more modifications, wherein the plurality of natural language response portions are generated by the AI deep learning language model using the modified language model writing matrix.

15. The method of claim 14, wherein the one or more modifications comprise a modification to natural language text in the language model writing matrix.

16. The method of claim 11, the method further comprising:

generating a Requirements Driven Outline (RDO) based on the plurality of discrete requirements, the RDO comprising, for each discrete requirement from among the plurality of discrete requirements: (a) natural language text of the discrete requirement, and (b) a requirement name and/or a requirement identifier associated with the discrete requirement.

17. The method of claim 16, the method further comprising:

transmitting the RDO to a client device; and receiving, from the client device, a modification to an order of discrete requirements defined in the requirement specifications or a modification to the natural language text of one or more discrete requirements.

18. The method of claim 11, the method further comprising:

applying a machine learning model to identify the plurality of response sections from the corpus of response documents, the machine learning model being trained to identify the plurality of response sections from unstructured content in the corpus of response documents to structure the unstructured content.

19. A non-transitory computer-readable medium storing instructions that, when executed by one or more processors, program the one or more processors to:

access at least one discrete requirement obtained from a requirement specification;

identify a relevant content portion from a datastore that stores relevant content portions derived from response documents that were each previously generated in response to a corresponding prior requirement specification;

generate a language model writing matrix based on the at least one discrete requirement and the relevant content portion;

automatically generate, based on a deep learning artificial intelligence (AI) language model and the language model writing matrix, natural language text that is responsive to the at least one discrete requirement;

add the natural language text to a response document to satisfy the at least one discrete requirement; and generate the response document to respond to the requirement specification.

20. The non-transitory computer-readable medium of claim 19, wherein the instructions, when executed by one or more processors, further program the one or more processors to:

label at least one section of the requirement specification based on a machine-learning model trained to identify and label sections of requirement specifications;

obtain the at least one discrete requirement from the at least one section; and generate a Requirements Driving Outline (RDO) that includes the at least one discrete requirement, wherein the RDO is used to identify the relevant content portion based on the at least one discrete requirement included in the RDO.

* * * * *